United States Patent [19]
Wright

[11] 3,892,718

[45] July 1, 1975

[54] INHIBITION OF DIALLYLIC PHTHALATE POLYMER COMPOSITIONS

[75] Inventor: Carl Leonard Wright, Pennington, N.J.

[73] Assignee: FMC Corporation, New York, N.Y.

[22] Filed: June 1, 1973

[21] Appl. No.: 366,176

[52] U.S. Cl.... 260/78.4 UA; 260/42.17; 260/42.18; 260/42.52
[51] Int. Cl. ............................................. C08f 3/60
[58] Field of Search ............................ 260/78.4 UA

[56] References Cited
UNITED STATES PATENTS

| | | | |
|---|---|---|---|
| 2,632,751 | 3/1953 | Anderson | 260/40 |
| 2,990,388 | 6/1961 | Johnston | 260/23 |
| 3,445,312 | 5/1969 | Rider | 156/332 |

OTHER PUBLICATIONS

Chem. Abst., Vol. 77, P. 127503m, 1972.
Chem. Abst., Vol. 68, P. 50625g, 1968.
Chem. Abst., Vol. 70, P. 48588v.
Chem. Abst., Vol. 65, P. 5534g.

*Primary Examiner*—Joseph L. Schofer
*Assistant Examiner*—John Kight

[57] ABSTRACT

Diallylic phthalate prepolymer compositions whose polymerization is controlled by addition thereto of very small proportions of phenothiazine as an inhibitor. The compositions are particularly suitable for the formulation of encapsulation molding compounds.

4 Claims, No Drawings

INHIBITION OF DIALLYLIC PHTHALATE POLYMER COMPOSITIONS

This invention relates to thermosetting diallylic phthalate compositions whose polymerization rate during thermosetting is controlled. More particularly, this invention relates to thermosetting diallylic phthalate compositions containing an improved inhibitor system.

Thermosetting compositions derived from diallylic phthalate prepolymers are described in U.S. Pat. No. 3,579,484, issued May 18, 1971, to Thomas. These are well known to provide excellent electrical and mechanical properties in molded articles. Control of polymerization during processing of diallylic prepolymers into thermosetting compositions is often difficult and results in undesirable variations in flow and reactivity of the thermosetting compositions or molding compounds.

In spite of the desirable properties of diallylic phthalate prepolymers, such as water resistance and dimensional stability, they have generally not been adopted for use in the mold encapsulation of pressure-sensitive devices such as transistors, diodes, miniature integrated circuits and the like. This is due to the difficulties in effectively controlling polymerization and melt viscosity of these prepolymers. Thus, the use of diallylic phthalate molding compounds has been limited mainly to non-pressure-sensitive devices.

The employment of various inhibitors and retarders is known as a method of overcoming these problems. Compounds such as t-benzoquinone, hydroquinone, t-butyl catechol and similar phenolic compounds are widely used as polymerization inhibitors. However, for low pressure molding applications, such as in the transfer mold encapsulation of electronic components, improved inhibitor systems are always desirable. Particularly desirable are systems which allow the attainment of a minimum melt viscosity and a relatively long induction period.

Inhibitors function to prevent the formation of measurable amounts of polymer under conditions which otherwise would allow such polymerization. Retarders reduce the rate at which polymer is formed. In peroxide-initiated free radical polymerization, the polymerizable free radical preferentially reacts with the inhibitor and the inhibitor is consumed in the process to yield an unreactive moiety. The extent of time during which this inhibitor activity takes place is referred to as the induction period, i.e., polymerization conditions exist, but in the presence of inhibitor no measurable reaction occurs.

Moreover, in transfer mold encapsulation compounds, it is desirable to minimize the concentration of inhibitors so as not to adversely affect the physical properties of the cured product. For the encapsulation of electronic components, effective control of polymerization conditions and melt viscosity is essential to the successful employment of a polymer system.

In accordance with the present invention, there are provided thermosetting diallylic phthalate prepolymer compositions comprising (a) a diallylic phthalate prepolymer selected from the group consisting of diallyl isophthalate and diallyl orthophthalate prepolymers, (b) 0.001 to 0.1 percent by weight phenothiazine, based on the weight of the prepolymer, and (c) a peroxide catalyst in sufficient amount to convert the diallylic phthalate prepolymer to the thermoset state at elevated temperatures.

The diallylic phthalate prepolymers, diallyl orthophthalate and diallyl isophthalate, used in this invention are generally manufactured in a conventional fashion by polymerizing a monomeric material to produce a solution of the soluble prepolymer in monomer, to a point short of gelation, which occurs when the molecular weight of the prepolymer reaches a point when it becomes insoluble in the monomer. These prepolymer-monomer solutions (called "dopes") are then separated into a solvent-soluble prepolymer fraction and monomer. This may be accomplished by treatment with a solvent which dissolves the monomer while precipitating the prepolymer, or by other means which leave a soluble prepolymer substantially free of monomer. A typical method of separating such polymers is described by Willard in U.S. Pat. No. 3,030,341, issued Apr. 17, 1962. These prepolymers are solids containing little or no monomers; they can be stored indefinitely in this form, since they require catalyst and either heat or actinic light to convert them into the insoluble stage.

Another method of producing diallyl phthalate prepolymer is to polymerize the diallylic phthalate under conditions which leave no significant amount of catalyst residue in the polymerization dope. This is done either (a) by using a diallyl phthalate which will polymerize in the absence of a catalyst at 200°C under nitrogen at a rate indicated by an increase of refractive index $N_D$ of at least about 0.000012 per minute, and either thermally polymerizing without catalyst, or using catalyst in such small quantity that it is substantially destroyed before the end of the polymerization, or (b) by catalyzing by the continuous introduction of a catalyst with a low half-life at the polymerization temperature during the early part of the polymerization and finishing the polymerization thermally; and, as is described in U.S. Pat. No. 3,385,836, issued May 28, 1968, to Mednick et al., distilling the dope continuously under high vacuum in a still of short residence time, in which the dope is spread as a thin film in order to insure rapid heat transfer and high evaporative surface at an elevated temperature such that the viscous residue will flow from the still.

It is a highly significant aspect of the compositions of the present invention that only relatively very small proportions of phenothiazine are required to give effective inhibition to the diallylic phthalate prepolymers in the presence of air and peroxide catalysts. Generally speaking, from about 0.001 to 0.1 percent by weight, based on the weight of the prepolymer, is employed in the thermosetting compositions of the present invention, i.e., 0.001 part to 0.1 part per 100 parts of prepolymer. Thus, minimum melt viscosity and longer induction periods are obtained with relatively low concentrations of inhibitors, when compared, for example, with heretofore known phenolic-type inhibitors such as hydroquinone, t-butyl catechol and the like.

It has further been observed that the phenothiazine polymerization inhibitor of the present invention is compatible with other heretofore known inhibitors and even produces a synergistic effect with phenolic inhibitors such as mono- and di-hydroxy benzenes and the mono-, di-, and tri-lower $C_1$–$C_6$ alkyl substituted and amino substituted derivatives thereof. Phenothiazine has been found to be particularly suitable for use together with t-butyl catechol or 2,6-di-t-butyl-alpha-dimethyl amino p-cresol. These supplemental inhibitors may also be present in amounts ranging from 0.001 to 0.1 percent by weight, based on the weight of prepolymer. Retarders, which function to slow down the rate of polymerization after the initial induction period, may also be employed in combination with the phenothiazine and are present in amounts of from 0.01 to 1.5 percent by weight, based on the weight of prepolymer. Anthracene is a particularly suitable retarder for use in the compositions of the present invention.

The novel compositions of this invention employ a free radical catalyst in sufficient amount to convert the polymerizable resin to the thermoset state upon the application of heat. Conventionally, peroxide catalysts are used in amounts of about 1 to 10 percent, and preferably 2 to 3 percent, by weight, based on the weight of the prepolymer. Exemplary catalysts are dicumyl peroxide, tertiary butyl perbenzoate and 2,5-dimethylhexane-2,5-diperbenzoate, either alone or in combination with benzoyl peroxide. Dicumyl peroxide and tertiary butyl perbenzoate are particularly preferred. In any event, the catalysts well known in the art to promote the cure of allylic compositions are generally useful in practicing this invention.

The compositions of the present invention are particularly suitable for use in the transfer mold encapsulation of electrical devices. In this technique, since pressure sensitive electrical and electronic devices are being encapsulated, inhibitor systems which significantly reduce the melt viscosity of the prepolymer and at the same time delay the onset of polymerization, i.e., lengthen the induction period, are of the utmost importance.

A wide variety of water-insoluble, inert inorganic fillers may be used in formulating the molding compositions. Typical useful fillers include silica, ground glass, clays, preferably calcine clays (aluminum silicate), magnesium silicate, calcium silicate, quartz, alumina, alumina trihydrate, antimony oxide and the like.

Additionally, inert fibrous materials may be used, such as glass fibers, polyester or nylon fibers, or mineral fibers such as asbestos fibers. Pigments such as carbon black may also be used, if desired, because some electronic devices are light sensitive. Nevertheless, pigments or fillers should always be evaluated to determine their effect upon the melt viscosity of the molding compound. Up to about 300 parts by weight of these fillers and/or fibers per 100 parts by weight of diallylic phthalate prepolymer resin may be used in formulating molding compositions according to the present invention.

Other additives conventionally employed in the formulation of diallylic phthalate based molding compositions may be also used, such as glass coupling agents, internal mold release agents, and the like. Useful glass coupling agents include vinyl-tris(2-methoxy ethoxy)silane and gamma methacryloxy-propyl-trimethoxy silane. Exemplary mold release agents are the fatty acids such as lauric acid and salts of fatty acids such as calcium stearate.

On a part by weight basis, typical compositions suitable for transfer mold encapsulation will contain 20 to 100 parts of diallylic phthalate prepolymer resins, 0 to 80 parts, preferably 15 to 80, of inert particulate fillers such as finely divided silica, and 0 to 70, preferably 15 to 60, parts of an inert inorganic fibrous filler such as chopped glass fibers. The amount of peroxide catalyst used is generally of about 1 to 10 percent by weight, based on the weight of the resins. Glass coupling agents, when desired, are used in the amount of 0.5 to 2 percent by weight, based on the weight of the resins. Internal mold release agents are used at levels of 0.1 to 2 percent by weight, based on the weight of the resins. Pigments are used in an amount effective to give a desired color, and in the case of carbon black as little as 0.1 part per 100 parts of the molding compound is generally effective. The amount of phenothiazine and/or other inhibitors or retarders will vary over the range of from about 0.001 to 0.1 percent by weight each, based on the weight of the resins.

The following examples illustrate the compositions of the present invention, but should not be considered as limitative of its scope. All parts and percentages are by weight and temperatures are in degrees centigrade unless otherwise noted.

EXAMPLE I

A series of samples containing diallyl isophthalate prepolymer and various inhibitors were evaluated for consistency or viscosity change under thermosetting conditions in a torque rheometer. The torque rheometer used was a Brabender Plasticorder manufactured by C. W. Brabender Instruments, Inc., Hackensack, New Jersey, U.S.A., using a 60 gram sample in a number 6 head at 33⅓ rpm at 135°C. The instrument records consistency versus time in meter-gram units. All ingredients except catalyst are blended together and charged to the mixing head of the Plasticorder. When thoroughly fluxed as indicated by stabilizing of the consistency, catalyst is added and time is designated as zero. Consistency change is then observed at 135°C up to the limit of the instrument or until the sample is converted to a crumbly gel. The data are tabulated below in Table I. In all samples 3 phr (parts per hundred parts of prepolymer) of di-cumyl peroxide catalyst was used.

TABLE I

Diallyl Isophthalate Inhibition — 135°C

| Sample No. | Inhibitor (% by weight based on prepolymer) | Minimum Melt Viscosity (M-g) | Induction (min) | Gel Time (min) |
|---|---|---|---|---|
| 1 | None | 420 | 2.5 | 2.3 |
| 2 | Phenothiazine, 0.005 | 280 | 4.5 | 3.3 |
| 3 | Phenothiazine, 0.01 | 280 | 5.5 | 8.5 |
| 4 | Phenothiazine, 0.02 | 270 | 6.0 | 9.8 |
| 5 | Phenothiazine, 0.05 | 300 | 6.0 | 15.5 |
| 6 | t-butyl catechol, 0.02 | 330 | 4.0 | 7.0 |
| 7 | Phenothiazine, 0.01 t-butyl catechol, 0.01 | 270 | 7.0 | 10.0 |

Sample 6 is comparative data using a known phenolic-type inhibitor, and Sample 7 shows a synergistic effect when phenothiazine is used in combination with this inhibitor.

EXAMPLE II

Example I was repeated except that the evaluations were carried out at 121°C and 2 phr of tert-butyl perbenzoate was used as the catalyst. The data are set forth below in Table II.

TABLE II

Diallyl Isophthalate Inhibition — 121°C

| Sample No. | Inhibitor (% by weight based on prepolymer) | Minimum Melt Viscosity (M-g) | Induction (min) | Gel Time (min) |
|---|---|---|---|---|
| 8 | None | 670 | 3.0 | 2.3 |
| 9 | Phenothiazine, 0.02 | 610 | 7.0 | 8.6 |
| 10 | t-butyl catechol, 0.02 | 620 | 5.5 | 6.7 |
| 11 | Phenothiazine, 0.01 t-butyl catechol, 0.01 | 560 | 7.5 | 9.5 |
| 12 | Ethyl 703*, 0.02 | 680 | 4.6 | 6.0 |
| 13 | Ethyl 703*, 0.01 Phenothiazine, 0.01 | 550 | 7.0 | 7.2 |

*Trademark for 2,6-di-t-butyl-alpha-dimethyl amino p-cresol

Samples 11 and 13, when compared with samples 9, 10 and 12, definitely show a synergistic effect when phenothiazine is used in combination with phenolic-type inhibitors.

EXAMPLE III

Samples are again evaluated as in Example II except that diallyl orthophthalate prepolymer is employed. The data are reported in Table III.

TABLE III

Diallyl Orthophthalate Inhibition — 121°C

| Sample No. | Inhibitor (% by weight based on prepolymer) | Minimum Melt Viscosity (M-g) | Induction (min) | Gel Time (min) |
|---|---|---|---|---|
| 14 | None | 1120 | 5.0 | 10.0 |
| 15 | Phenothiazine, 0.01 | 760 | 9.0 | 9.3 |

EXAMPLE IV

A composition suitable for use as a transfer mold encapsulation compound is prepared and contains the following ingredients:

|  | Parts |
|---|---|
| Diallyl isophthalate prepolymer of Example I, BMV 670[1] | 40 |
| Glass Fibers - ⅛" | 30 |
| Finely divided silica (Novacite No. 1250) | 30 |
| Carbon Black Raven No. 30 | 0.2 |
| Titanium Dioxide | 1.0 |
| Lauric Acid | 1.0 |
| Dicumyl Peroxide | 2.0 |
| Vinyl-tris(2-methoxyethoxy)silane | 0.2 |
| Anthracene (retarder) | 0.2 |
| Phenothiazine | 0.008 |
| t-butyl catechol | 0.004 |

[1]Brabender Melt Viscosity at 121°C

Brabender Plasticorder data for this information are given below in Table IV at various temperatures.

TABLE IV

| Temperature | Encapsulation Compound Melt Viscosity (M-g) | Induction (min) | Gel Time (min) |
|---|---|---|---|
| 121°C | 440 | 10.0 | >60 |
| 135°C | 220 | 8.0 | 11.0 |
| 149°C | 150 | 2.7 | 3.0 |

What is claimed is:

1. A thermosetting diallylic phthalate prepolymer composition comprising (a) a diallylic phthalate prepolymer selected from the group consisting of diallyl isophthalate and diallyl orthophthalate prepolymers, (b) from about 0.001 to 0.1 percent by weight phenothiazine based on the weight of prepolymer, and (c) a peroxide catalyst in sufficient amount to convert the diallylic phthalate prepolymer to the thermoset state at elevated temperatures.

2. The thermosetting composition of claim 1 wherein said prepolymer is diallyl isophthalate.

3. The thermosetting composition of claim 1 further comprising 0.001 to 0.1 percent by weight based on the weight of said prepolymer of a phenolic inhibitor selected from the group consisting of mono- and di-hydroxy-benzenes and the mono-, di-, and tri- lower alkyl substituted and amino substituted derivatives thereof.

4. The thermosetting composition of claim 1 further comprising from 0.01 to 1.5 percent by weight based on the weight of said prepolymer of anthracene as a retarder.

* * * * *